DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 819

T900,012

PHOTOGRAPHIC DIFFUSION TRANSFER ELEMENTS, FILM UNITS, AND METHODS FOR PROCESSING SAME

John V. Williams, Pittsford, N.Y.
(Rochester, N.Y. 14650)

Filed Oct. 4, 1971, Ser. No. 186,395
**Int. Cl. G03c *1/40***
U.S. Cl. 96—77
No Drawing. 15 Pages Specification

Photosensitive elements are described comprising:

(a) a nuclei layer containing physical development nuclei and a nondiffusible coupler capable of reacting with oxidized aromatic primary amino color developing agent to produce a diffusible dye, the nuclei layer being free of any silver salt; and (b) a photosensitive silver halide emulsion layer containing a development inhibitor-releasing compound capable of reacting with oxidized color developing agent to release a diffusible development inhibitor.

The photosensitive element is processed with an alkaline processing composition in the presence of a color developing agent and a silver halide solvent. Upon development, the color developing agent becomes oxidized and reacts with the development inhibitor-releasing compound, preferably a coupler to release a diffusible development inhibitor imagewise. The remaining silver halide in the emulsion layer corresponding to unexposed and thus undeveloped areas forms a soluble silver ion complex with the silver halide solvent present. The complex migrates to the nuclei layer where it is then physically developed causing the developing agent to become oxidized. The oxidized developing agent then reacts with the nondiffusible coupler to form an imagewise distribution of diffusible dye which transfers to a dye image-receiving layer to provide a positive dye image.